United States Patent
Fujino

(10) Patent No.: US 7,618,540 B2
(45) Date of Patent: Nov. 17, 2009

(54) FLOCCULANT FOR SEPARATING AND FLOCCULATING OIL AND WATER

(75) Inventor: Kiyoharu Fujino, Mie (JP)

(73) Assignee: Japan ALSI Co., Ltd, Mie (JP)

( * ) Notice: Subject to any disclaimer, the term of this patent is extended or adjusted under 35 U.S.C. 154(b) by 0 days.

(21) Appl. No.: 12/316,616

(22) Filed: Dec. 15, 2008

(65) Prior Publication Data

US 2009/0105355 A1  Apr. 23, 2009

Related U.S. Application Data

(63) Continuation of application No. 10/148,735, filed as application No. PCT/JP01/08962 on Oct. 12, 2001, now abandoned.

(30) Foreign Application Priority Data

Oct. 13, 2000  (JP) .............. 2000-313682

(51) Int. Cl.
  *B01D 17/05*  (2006.01)
  *B01D 21/01*  (2006.01)
  *C02F 1/56*  (2006.01)
  *C08F 220/34*  (2006.01)
  *C09K 3/32*  (2006.01)

(52) U.S. Cl. .................. 210/705; 526/287; 210/723; 524/815; 516/151

(58) Field of Classification Search .............. 210/705, 210/723; 524/815; 516/151; 526/287
See application file for complete search history.

(56) References Cited

U.S. PATENT DOCUMENTS

| 4,127,500 A | 11/1978 | Suzuki et al. |
| 4,182,690 A | 1/1980 | Suzuki et al. |
| 4,305,860 A * | 12/1981 | Iovine et al. .............. 162/164.5 |
| 4,652,623 A * | 3/1987 | Chen et al. .................. 526/287 |

FOREIGN PATENT DOCUMENTS

| JP | 52-061356 | 5/1977 |
| JP | 53-011183 | 2/1978 |
| JP | 53-061575 | 6/1978 |
| JP | 63-221810 | 9/1988 |
| JP | 01-281107 | 11/1989 |
| JP | 02-298304 | 12/1990 |
| JP | 04-504675 | 8/1992 |
| JP | 07-232005 | 9/1995 |
| JP | 11-033309 | 2/1999 |
| WO | WO90/12633 | 11/1990 |

* cited by examiner

*Primary Examiner*—Kelechi C Egwim
(74) *Attorney, Agent, or Firm*—James V. Costigan; Hedman & Costigan, P.C.

(57) ABSTRACT

A flocculant for separating and flocculating oily components and water components is provided so that no sludge is produced when the oily components and the water components contained in the emulsion having a high COD value; and the throughput of the active sludge is not decreased in the secondary treatment of the active sludge. A flocculant for separating and flocculing oily components and water components contained in oil-in-water type or water-in-oil type emulsion, comprises a unit (i), and at least one of units (ii) and (iii) represented by the following formulas: (i) —$(C(R_1R_2)C(R_3X))$—, (ii) —$(C(R_4R_5)C(R_6Y))$—, (iii) —$(C(R_7R_8)C(R_9Z))$—; wherein X is a group having —$SO_3M$, M is hydrogen or a metal element, Y is a group having a quaternary nitrogen atom, Z is an electrophilic group, each $R_1$ to $R_9$ is hydrogen or an alkyl group, and a ratio per molecule of these units (i):(ii):(iii) is (1 to 100):(1 to 100):(1 to 100).

5 Claims, No Drawings

FLOCCULANT FOR SEPARATING AND FLOCCULATING OIL AND WATER

This application is a continuation of application Ser. No. 10/148,735, filed May 31, 2002 which claims priority from PCT/JP01/08962, filed Oct. 12, 2001 which claims priority from JP 2000-313682, filed Oct. 13, 2000.

BACKGROUND OF THE INVENTION

The present invention relates to a flocculant for separating and flocculating oil and water. More particularly, the present invention relates to a flocculant for separating and flocculating oily components and water components contained in oil-in-water type or water-in-oil type emulsion, and a method for separating and flocculating oil and water.

Water lubricants are widely utilized in the iron and steel manufacturing and machining art. The water lubricants are advantageous in that they are incombustible, inexpensive, nontoxic, and safety, and have excellent cooling, viscosity changing, and compression properties as compared with petroleum lubricants. Accordingly, the water lubricants are widely used as oil-in-water type or water-in-oil type emulsion in cutting oil and grinding fluid. With an increase in the use of the water lubricants, it becomes a problem how to treat a waste water lubricant or waste liquid containing such water lubricants.

Conventionally, the waste water lubricant or the waste liquid is separated and flocculated with a flocculant as a primary treatment. For example, there is an inorganic flocculant such as aluminum sulfate referred to as "sulfate band", and poly(aluminum chloride) referred to as "pack", and an organic flocculant such as polyacrylic amide based polymer. These flocculants are added to the waste water lubricant or the waste liquid to break the emulsion, whereby the oily components and the water components are separated.

The separated water components are secondary treated, for example, by an active sludge treatment.

Japanese Patent Laid-Open Application No. 11-33309 describes an organic flocculant terminated at their molecular ends with —OSO$_3$M groups that do not reduce throughput of the active sludge.

When the inorganic flocculant is used in the primary treatment, the pH of the water lubricant is often decreased. It requires to neutralize it with alkali such as caustic soda. This may undesirably result in complex processes, and increased costs.

In addition, the inorganic flocculant absorbs and precipitates the waste while producing a large amount of colloidal particles. Therefore, a large amount of the inorganic flocculant is required. As a result, a large amount of sludge is produced, whereby the disposal costs for the sludge are undesirably increased.

Furthermore, the inorganic flocculant may adversely affect the secondary treatment of the active sludge. For example, when the remaining inorganic flocculant is deposited on the active sludge, an oxygen consumption rate of the active sludge is reduced, or the sludge is partially decomposed, whereby the throughput of the active sludge is reduced.

On the other hand, an amount of the organic flocculant such as polyacrylic amide based polymer is as low as ½ to ½00 of that of the inorganic flocculant used in the active sludge treatment. However, the organic flocculant less removes the oily components and a surfactant, and therefore undesirably decreases the throughput of the active sludge.

Even if the organic flocculant is terminated at their molecular ends with —OSO$_3$M groups, a chemical oxygen demand (COD) of the waste water is less decreased, when the waste water has a high COD value.

When oil and water is separated in the oil and water separating step, mayonnaise-like sludge is produced at an interface of the oil and the water. The mayonnaise-like sludge may sometimes be separated in several hours. Typically, the separation of the oil and the water takes a longer time. A water content in an oily layer unfavorably increases.

SUMMARY OF THE INVENTION

An object of the present invention is to provide a flocculant for separating and flocculating oily components and water components, and a method for separating and flocculating oil and water using the flocculant so that no sludge is produced when the oily components and the water components contained in oil-in-water type or water-in-oil type emulsion, especially the emulsion having a high COD value are separated; the throughput of the active sludge is not decreased in the secondary treatment of the active sludge; the oily components and the water components can be separated in a short time; and the water content in the oily layer can be decreased.

One aspect of the present invention is a flocculant for separating and flocculating oily components and water components contained in oil-in-water type or water-in-oil type emulsion, comprising a unit (i), and at least one of units (ii) and (iii) represented by the following formulas:

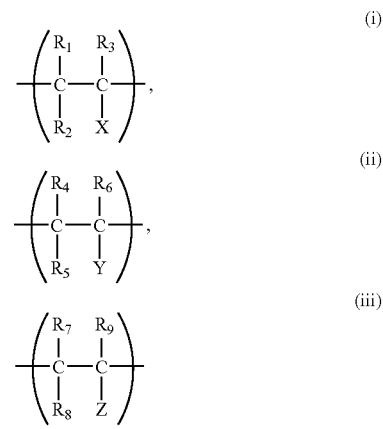

wherein X is a group having —SO$_3$M, in which M is hydrogen or a metal element, Y is a group having a quaternary nitrogen atom, Z is an electrophilic group, each R$_1$ to R$_9$ is hydrogen or an alkyl group, and a ratio per molecule of these units (i):(ii):(iii) is (1 to 100):(1 to 100):(1 to 100).

The terms "oily components" and "water components" herein mean components in an oily layer, and components in a water layer of the emulsion that contains oil, water, a surfactant, a stabilizer, and contaminants, respectively.

The term "electrophilic group" herein means a group containing an atom having a cationic ion and an empty orbital with high electron affinity, provided that a quaternary nitrogen atom is excluded in the group.

In the flocculant of the present invention, the units are connected and terminated at their ends with —OSO$_3$M groups, in which M is hydrogen or a metal element.

At least one of the X, Y, and Z groups includes an alkylene oxide moiety.

Other aspect of the present invention is a flocculant for separating and flocculating oily components and water components contained in oil-in-water type or water-in-oil type emulsion, comprising a mixture of a compound represented by the general formula $R_0$-Q, and a compound having at least a cationic group, wherein the $R_0$ is a hydrocarbon having at least an unsaturated linking in a molecule, and a residue group of the unsaturated linking of a derivative thereof, and Q is either an —$SO_3M$ group or an —$OSO_3M$, in which M is hydrogen or a metal element.

In the flocculant of the present invention, a non-ionic surfactant is added to the mixture of the compound represented by the general formula $R_0$-Q, and the compound having at least a cationic group.

The term "residue group of the unsaturated linking" herein means a part other than an unsaturated linking relating to the reaction, specifically means a residue to which Q is connected.

The term "cationic group" herein means a group having a quaternary nitrogen atom and an electrophilic group.

Still other aspect of the present invention is a method for separating and flocculating oily components and water components contained in oil-in-water type or water-in-oil type emulsion, comprising the step of at least adding the above-mentioned flocculant to the oil-in-water type or the water-in-oil type emulsion.

The step of adding the flocculant is performed under the condition that an alkaline earth metal ion coexists.

The flocculant of the present invention consists of (a) a unit containing a group having —$SO_3M$ and a group having a quaternary nitrogen atom, (b) a unit containing a group having —$SO_3M$ and an electrophilic group, or (c) a unit containing a group having —$SO_3M$, a group having a quaternary nitrogen atom, and an electrophilic group. Among them, the combinations (a) and (c) are most preferable, because the units contain the group having —$SO_3M$ and the group having a quaternary nitrogen atom as essential components. The groups in the units easily are crosslinked with and adsorb microflocs of the colloidal particles. The units containing the group having —$SO_3M$ increase hydrophobic property. If the emulsion has a high COD value, the oily components and the water components are separated, and the emulsion is easily flocculated.

When an alkylene oxide moiety is introduced to the groups of respective units, the emulsion having the high COD value is well separated.

The ratio of the respective units is to be within the predetermined range, and a molecular weight represented by ultimate viscosity is to be the value defined as described later, whereby microorganisms in the active sludge are less affected.

When the emulsion is separated using such flocculant according to the present invention, the active sludge is less produced after separation, and subsequent active sludge treatment can be easily conducted.

DETAILED DESCRIPTION OF THE PREFERRED EMBODIMENTS

The unit (i) for use in the present invention includes an —$SO_3M$ group, wherein M is hydrogen or a metal element. The —$SO_3M$ group is bonded at an end of a side chain of the polymer. The metal element is preferably an alkali metal element that render water solubility to the flocculant, i.e., Na, K, and Li. Examples of the —$SO_3M$ group include —$C_6H_6SO_3H$—, —$CONHCH_2CH_2C(CH_3)_2CH_2SO_3H$, —$CONHCH_2C(CH_3)_2CH_2SO_3H$, and —$CONHC(CH_3)_2CH_2SO_3H$.

The unit (i) is formed by adding a monomer having the —$SO_3M$ group and a double bond upon polymerization. Examples of the monomer include sulfonic acids including styrene sulfonic acid, ethylene sulfonic acid, and 2-acrylic amide-2-methylpropane sulfonic acid; and alkali metal salts thereof.

In the present invention, a sodium salt, a potassium salt, or a lithium salt of the styrene sulfonic acid is preferable. It is also preferable that alkaline earth ions including calcium ions, barium ions, and magnesium ions coexist, since they contribute to excellent oil separation during a flocculation reaction.

The unit (ii) for use in the present invention includes Y which is a group having a quaternary nitrogen atom, i.e., a quaternary ammonium group, a quaternary pyridine group, and a quaternary amino group. Specific examples of Y include acrylic acids including quaternary dimethylaminoethyl methacrylate, quaternary dimethylaminoethyl acrylate, and —$COOC_2H_4N^+(CH_3)_3Cl^-$.

The unit (ii) is formed by adding a monomer including the group having a quaternary nitrogen atom upon polymerization. Examples of the monomer include acrylic acid dimethylaminoethylmethylchloride monomer, and methacrylic acid dimethylaminoethylmethylchloride monomer.

The unit (iii) for use in the present invention includes Z which is an electrophilic group, i.e., —$CONH_2$ group, and a derivative group thereof. A derivative group of —COOH group may also be used. These derivative groups are groups where a hydrogen atom in an amide group or a carboxyl group is substituted, and include —$CONHCH_2OH$, —$CON(CH_3)_2$, —$CONHCH_2OCH_2CH(CH_3)_2$, —$COOCH_2CH_2N(CH_3)_2$.

The unit (iii) is formed by adding a monomer including the electrophilic group upon polymerization. Examples of the monomer include methyl acrylate, and amide acrylate.

In the units (i), (ii) and (iii), each $R_1$ to $R_9$ represents hydrogen or an alkyl group. Hydrogen is herein preferable in that hydrophilic property is easily provided. As the alkyl group, a lower alkyl group is preferable. The lower alkyl group refers to a linear or branched alkyl group having 1 to 4 carbon atoms.

At least one of X, Y, and Z groups in the units (i), (ii) and (iii) includes an alkylene oxide moiety. The alkylene oxide moiety acts as a surfactant to effectively separate and flocculate the oily and water components, even if the emulsion has the high COD value.

The alkylene oxide moiety is represented by the formula —$(C_2H_{2n}O)_m$—, wherein n is preferably 2 or 3, and m is determined by a chemical structure of X, Y or Z as long as reactivity of the flocculant upon formation is not decreased. For example, in an adduct of styrene sulfonate with ethylene oxide [$CH_2$=$CHC_6H_4SO_3$—$(C_nH_{2n}O)_m$—H] produced by reacting a sulfonic acid group of styrene sulfonic acid with ethylene oxide, n is 2, and m is preferably about 1 to 3.

In an adduct of amino ethyl methacrylate with ethylene oxide [$CH_2$=$C(CH_3)COOC_2H_4NH$—$(C_nH_{2n}O)_m$—H] produced by reacting one hydrogen of an amino group of a aminoethyl methacrylate with ethylene oxide, or in an adduct of amino ethyl methacrylate with ethylene oxide [$CH_2$=$C(CH_3)COOC_2H_4N$—$((C_nH_{2n}O)_m$—$H)_2$] produced by reacting two hydrogen of the amino group with ethylene oxide, n is 2, and m is preferably 1 to 30, more preferably 1 to 5 provided that the ethylene oxide adduct is liquid.

The alkylene oxide adduct is used for producing the flocculant after the monomer including the alkylene oxide moiety is prepared. Upon starting the polymerization, a mixture of monomers with/without the alkylene oxide adduct can be used. It is preferable that the mixture comprise 10 mol % or more of the monomer including the alkylene oxide adduct.

The flocculant for separating and flocculating oily components and water components according to the present invention may comprise a copolymer in which a unit represented by the following formula in the polymer chain.

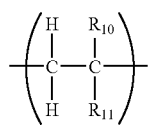

wherein $R_{10}$ is hydrogen or a lower alkyl group, $R_{11}$ is a carboxyl group, an alkoxyl group, an amino group, a group having these groups at an end, or a derivative thereof.

The above-mentioned unit is, for example, obtained by copolymerizing vinyl monomers. Examples of the vinyl monomer include acrylic acid, methacrylic acid, n-butyl acrylate, 2-methoxy ethyl acrylate, 2-ethoxy ethyl acrylate, dimethylaminoethyl methacrylate, and dimethylaminoethyl acrylate. As the copolymer, low costs and industrial available acrylate and methacrylate are preferable.

The flocculant of the present invention can comprise the $—OSO_3M$ group at the end of the molecular connected to the above unit. In the $—OSO_3M$ group, M represents hydrogen or a metal element, i.e., Na, K, and Li. M is preferably Na, or K, since the salt can be produced having high water solubility with low costs in the industrial viewpoints. The flocculant comprising the $—OSO_3M$ group can easily separate and flocculate the oily and water components in the emulsion, and does not adversely affect the active sludge in the secondary treatment.

In the flocculant of the present invention, a ratio per molecule of the above-mentioned units (i):(ii):(iii) is (1 to 100):(1 to 100):(1 to 100).

The ratio of the units can be adjusted by changing a molar ratio of the monomers constituting them. The degree of polymerization can be represented by the ultimate viscosity. The ultimate viscosity is determined by dissolving a sample in a 2 mol/l KBr solution and measured at 25° C. The ultimate viscosity is preferably within the range of 0.001 to 0.6 dl/g. The above-defined units and the degree of polymerization within the above-described range represented by the ultimate viscosity are selected, whereby the oily and water components in the emulsion can be easily separated and flocculated, and the active sludge is not adversely affected in the secondary treatment.

The flocculant of the present invention is obtained by polymerizing each monomer for each unit in a hydrophilic solvent such as water, methanol, and ethanol using a peroxide initiator such as lauryl peroxide, and stilbutyl peroxide. When the $—OSO_3M$ group is introduced to the molecular end, copolymerization is conducted using a redox polymerization or a radical polymerization using a large amount of peroxodisulfuric acid salt, i.e., potassium peroxodisulfate ($K_2S_2O_8$). When the $—OSO_3M$ group is needed to be introduced to the molecular end, a larger amount of peroxodisulfuric acid salt, i.e., potassium peroxodisulfate is used than the amount of the initiator. It is preferable that the 0.3 to 5 wt %, more preferably 0.3 to 1 wt % of peroxodisulfuric acid salt be mixed based on the total amount of the monomers.

The $—OSO_3M$ group may be not only at the molecular end, but also be in the molecular chain as a side chain. When the $—OSO_3M$ group is introduced into the molecular chain as the side chain, a compound having a double bond in its main chain as the units is used and reacted with peroxodisulfuric acid salt, i.e., potassium peroxodisulfate or sulfuric acid at the double bond. It is preferable that about equimolar amounts of peroxodisulfuric acid salt, i.e., potassium peroxodisulfate be reacted.

Other aspect of the flocculant according to the present invention is a mixture of the compound represented by the general formula $R_0$-Q, and a compound having at least a cationic group.

The $R_0$ is a hydrocarbon having at least an unsaturated linking in a molecule, and a residue group of the unsaturated linking of a derivative thereof.

A starting material of the $R_0$ include unsaturated fatty acids and aliphatic hydrocarbons including an unsaturated group. Examples of the unsaturated fatty acids include myristoleic acid, palmitoleic acid, oleic acid, elaidic acid, cisvaccenic acid, vaccenic acid, erucic acid, linoleic acid, linolenic acid, arachidonic acid, eicosapentaenoic acid, sardine oil, and docosahexaenoic acid. Examples of the aliphatic hydrocarbons including an unsaturated group include unsaturated higher alcohols corresponding to the unsaturated fatty acids.

The Q is an $—SO_3M$ group and/or an $—OSO_3M$ group. The $—SO_3M$ group or the $—OSO_3M$ group can be introduced to the molecular by reacting $SO_3$ gas or sulfuric acid with the unsaturated group of the $R_0$.

Specifically, 0.01 to 1.5 mol of sulfuric acid (in the case of the $—OSO_3M$ group) or of $SO_3$ gas (in the case of the $—SO_3M$ group) is reacted with 1 mol of the monomer including the unsaturated group such as oleic acid and linoleic acid at 10 to 50° C. for 2 to 8 hours.

The compound having at least a cationic group mixed with the compound represented by the general formula $R_0$-Q include a polymerizing compound having a cationic group in a main or side chain. The cationic group has preferably a quaternary nitrogen atom. Examples include a polymer of dimethylamine and epichlorohydrine, and a polymer having a quaternary nitrogen atom in a side chain.

Such a polymer has a molecular weight so that activity of the active sludge is not prohibited in the secondary treatment. If the molecular weight is too low, the cationic group develops a bactericidal property, and the active sludge may be destroyed. It is preferable that the compound having the cationic group have the ultimate viscosity of 0.001 to 0.6 dl/g.

Furthermore, a non-ionic surfactant can be added to the mixture of the compound represented by the general formula $R_0$-Q and the compound having at least a cationic group. The non-ionic surfactant can effectively separate mayonnaise-like sludge produced at the step of separating the oil and water into water and oil.

Examples of the non-ionic surfactant include polyoxyethylenealkyl ether, polyoxyethylenealkylphenol ether, polyoxyethylenestyrenated phenol ether, polyoxyethylenealkylamino ether, polyethyleneglycol fatty acid ester, polyoxyetylenepolypropylene glycol, glycerin fatty acid ester, pentaerythritol fatty acid ester, sorbitan fatty acid ester, polyoxyethylene sorbitan fatty acid ester, and fatty acid alkanolamide.

The non-ionic surfactant is added in the amount of 0.01 to 5 wt %, preferably 0.05 to 1 wt % based on the total amount of the mixture of the compound represented by the general formula $R_0$-Q and the compound having at least a cationic group. If the non-ionic surfactant is added in the amount of less than 0.01 wt %, the amount of the surfactant is too small to separate water and oil. If the non-ionic surfactant is added in the amount of more than 5 wt %, the oily components remain in the water, thereby increasing the COD value.

Thus-obtained flocculant for separating and flocculating oily components and water components of the present invention can be used as a solid form by removing the solvent used in the formation, or a water or hydrophilic solution form.

The flocculant of the present invention is added to the emulsion in the amount of 0.01 to 10 wt %, preferably 0.1 to 5 wt %, more preferably 0.1 to 3 wt % based on the total amount of the suspending matters and dissolved sludge contained in the emulsion depending on the conditions of the emulsion. Within the range, the oily components and the water components can be easily separated, and the amount of the sludge produced after separation and flocculation can be minimum.

In order to accelerate the separation and flocculation speed, it is preferable that anionic or cationic polymer flocculant be auxiliary added.

Such auxiliary flocculants can be added using any non-limiting method. For example, the auxiliary flocculants can be used in a powder form or in an original with high concentration, if they are agitated strongly in a reaction vessel, or in a diluted solution, if they are agitated weakly in the-reaction vessel. Examples of the solvent for diluting include water, a hydrophilic solvent, and a mixture of water and the hydrophilic solvent.

The flocculant for separating and flocculating oily components and water components of the present invention can be applied to the oil-in-water type or water-in-oil type emulsion. The emulsion may be an original before use, or be waste liquid after use, i.e., waste water containing dissolved sludge. Specifically, the flocculant of the present invention can be applied to any waste liquid obtained from general foods, painting, machine oil, machinery, certain food, a coolant, a coloring agent, oil, dyeing, papermaking, latex, and a surfactant.

EXAMPLE 1

The flocculent according to the present invention was prepared as follows:

In a closed reaction vessel equipped with a stirrer, a reflux condenser, and a thermometer, 5 mol of acrylic acid dimethylaminoethylmethyl chloride monomer $[CH_2=CHCOOC_2H_4N^+(CH_3)_3Cl^-]$, 1 mol of acrylic acid methyl monomer, and 0.3 mol of styrene sulfonic acid were sequentially added to 5 liters aqueous solution containing 0.02 mol of potassium peroxodisulfate ($K_2S_2O_8$) under nitrogen atmosphere, and reacted at 50° C. for 8 hours.

The resulting reaction product was dropped into a large quantity of acetone to produce a white powder polymer. The polymer was dissolved in a 2 mol/l KBr aqueous solution at the concentration of 0.5 g/l. Then, the polymer was measured for ultimate viscosity at 25° C. The ultimate viscosity of the polymer was 0.40 dl/g. The polymer had an —$OSO_3K$ group at an end of the molecule, and an —$SO_3H$ group and a cationic group having a quaternary nitrogen atom at a side chain of the molecule.

EXAMPLE 2

The flocculant according to the present invention was prepared as follows:

In a closed reaction vessel equipped with a stirrer, a reflux condenser, and a thermometer, 5 mol of acrylic acid dimethylaminoethylmethyl chloride monomer, and 0.1 mol of styrene sulfonic acid were sequentially added to 5 liters aqueous solution containing 0.02 mol of potassium peroxodisulfate under nitrogen atmosphere, and reacted at 50° C. for 8 hours.

The resulting reaction product was dropped into a large quantity of acetone to produce a white powder polymer. The polymer was dissolved in a 2 mol/l KBr aqueous solution at the concentration of 0.5 g/l. Then, the polymer was measured for ultimate viscosity at 25° C. The ultimate viscosity of the polymer was 0.30 dl/g. The polymer had an —$OSO_3K$ group at an end of the molecule, and an —$SO_3H$ group and a cationic group having a quaternary nitrogen atom at a side chain of the molecule.

EXAMPLE 3

The flocculant according to the present invention was prepared as EXAMPLE 2 except that methacrylic acid dimethylaminoethylmethyl chloride monomer $[CH_2=C(CH_3)COOC_2H_4N^+(CH_3)_3Cl^-]$ was used instead of acrylic acid dimethylaminoethylmethyl chloride monomer.

EXAMPLE 4

The flocculant according to the present invention was prepared as follows:

In a closed reaction vessel equipped with a stirrer, a reflux condenser, and a thermometer, 3 mol of acrylic acid dimethylaminoethylmethyl chloride monomer, 2 mol of methacrylic acid dimethylaminoethylmethyl chloride monomer, and 0.1 mol of styrene sulfonic acid were sequentially added to 5 liters aqueous solution containing 0.02 mol of potassium peroxodisulfate under nitrogen atmosphere, and reacted at 50° C. for 8 hours.

The resulting reaction product was dropped into a large quantity of acetone to produce a white powder polymer. The polymer was dissolved in a 2 mol/l KBr aqueous solution at the concentration of 0.5 g/l. Then, the polymer was measured for ultimate viscosity at 25° C. The ultimate viscosity of the polymer was 0.35 dl/g. The polymer had an —$OSO_3K$ group at an end of the molecule, and an —$SO_3H$ group and a cationic group having a quaternary nitrogen atom at a side chain of the molecule.

EXAMPLE 5

The flocculant according to the present invention was prepared as follows:

In a closed reaction vessel equipped with a stirrer, a reflux condenser, and a thermometer, 5 mol of acrylic acid dimethylaminoethylmethyl chloride monomer $[CH_2=CHCOOC_2H_4N^+(CH_3)_3Cl^-]$, 1 mol of acrylic acid methyl monomer, and 0.1 mol of styrene sodium sulfonate were sequentially added to 5 liters aqueous solution containing 0.01 mol of lauryl peroxide under nitrogen atmosphere, and reacted at 50° C. for 8 hours.

The resulting reaction product was dropped into a large quantity of acetone to produce a white powder polymer. The polymer was dissolved in a 2 mol/l KBr aqueous solution. Then, the polymer was measured for ultimate viscosity at 25° C. The ultimate viscosity of the polymer was 0.40 dl/g. The polymer had an —$SO_3Na$ group and a group having a quaternary nitrogen atom at a side chain of the molecule.

EXAMPLE 6

The flocculant according to the present invention was prepared as follows:

In a closed reaction vessel equipped with a stirrer, a reflux condenser, a jacketed cooler, and a thermometer, 278 g (1 mol) of α-linolenic acid and 200 g of benzene sodium sulfonate were added. While the reaction vessel was under nitrogen atmosphere, 270 g (1 mol) of potassium peroxodisulfate was added thereto, reacted at 50° C. for 8 hours, and then neutralized with potassium hydroxide to provide a solution No. 1.

Separately, in a closed reaction vessel equipped with a stirrer, a reflux condenser, and a thermometer, 100 g of 50 wt % dimethyl amine aqueous solution was added. While the reaction vessel was under nitrogen atmosphere, 102 g of epichlorohydrine was slowly added thereto at 30 to 80° C. to provide a solution No. 2.

The solution Nos. 1 and 2 were mixed at a weight ration of 1:1.

EXAMPLE 7

To 5 m³ of waste water containing cutting coolant replenisher used for machining (COD 5500 ppm), 4 kg of a 30 wt % solution of the white powder polymer obtained in EXAMPLE 1 was added, agitated for 10 minutes, and was allowed to stand for 24 hours.

After standing, oily components were separated as an upper layer. The oily components were isolated. The normal hexane extract in a water layer was 10 ppm. The COD was 1600 ppm.

To the waste water, 55 liters of a 0.1% aqueous solution of polyacrylic based anionic polymer flocculant (molecular weight of 12 million) was added. The oily components were separated after 2 hours standing. 18 liters of waste oil were produced, and 3 liters of mayonnaise-like sludge were produced.

On the other hand, sulfuric acid band was used as comparative example, 100 kg was required to treat the waste water. 1.2 m³ of floating scum, which was sludge containing the waste oil, was produced. Even if dewatering was conducted, 120 kg of dewatering cake with a dewatering rate of 80% was produced. The COD was 2300 ppm.

When the waste water was treated using an ultrafiltration (UF) membrane, the COD in permeated treated water was 1700 ppm, and 18 liters of oil components were recovered.

Then, the water layer separated from the oil components was mixed with sewage. The mixture had the biological oxygen demand (BOD) of 680 ppm, COD of 360 ppm, and SS value of 120 ppm. The mixture was introduced to an active sludge tank, and secondary treated under the following conditions:

| | |
|---|---|
| Primary treated water in which the oily components were separated | 20 m³/hr |
| Aeration tank capacity | 350 m³ |
| Returned sludge amount | 20 m³/hr |
| Active sludge conc. (dry solid to waste water) | 3500 ppm |
| Aeration amount | 6 m³/min |
| Treatment time of active sludge | 9 hr |

There was no change on the active sludge after the treatment. The active sludge could be used continuously. The treated waste water had BOD of 9 ppm, COD of 14 ppm, and SS value of 5 ppm.

EXAMPLE 8

The waste water containing cutting coolant replenisher (COD 5500 ppm) was treated as EXAMPLE 7 except that the flocculant obtained in EXAMPLE 2 was used instead of the flocculant obtained in EXAMPLE 1. The normal hexane extract in a water layer was 10 ppm. The COD was 1600 ppm. After the active sludge treatment, all the BOD, the COD, and the SS of the treated waste water were not more than 15 ppm.

EXAMPLE 9

The waste water containing cutting coolant replenisher (COD 5500 ppm) was treated as EXAMPLE 7 except that the flocculants obtained in EXAMPLES 3 to 5 were respectively used instead of the flocculant obtained in EXAMPLE 1. The normal hexane extract in a water layer was 10 ppm. The COD was 1600 ppm. After the active sludge treatment, all the BOD, the COD, and the SS of the treated waste water were not more than 15 ppm.

The waste water containing cutting coolant replenisher was treated under the condition that a calcium chloride aqueous solution coexisted, whereby the normal hexane extract in a water layer was 5 ppm, and the COD was 1550 ppm.

EXAMPLE 10

The waste water containing cutting coolant replenisher (COD 5500 ppm) was treated as EXAMPLE 7 except that the flocculant obtained in EXAMPLE 6 was used instead of the flocculant obtained in EXAMPLE 1. The normal hexane extract in a water layer was 15 ppm. The COD was 1800 ppm. After the active sludge treatment, all the BOD, the COD, and the SS of the treated waste water were not more than 15 ppm.

EXAMPLE 11

The flocculant according to the present invention was prepared as follows:

In a closed reaction vessel equipped with a stirrer, a reflux condenser, and a thermometer, 5 mol of methacrylic acid dimethylaminoethylmethyl chloride monomer [$CH_2=C(CH_3)COOC_2H_4N^+(CH_3)_3Cl^-$], 1 mol of acrylic acid methyl monomer, and 0.1 mol of styrene sulfonic acid ethylene oxide adduct were sequentially added to 5 liters aqueous solution containing 0.02 mol of potassium peroxodisulfate ($K_2S_2O_8$) under nitrogen atmosphere, and reacted at 50° C. for 8 hours. The styrene sulfonic acid ethylene oxide adduct was obtained by addition reacting 1 mol of styrene sulfonic acid with 2 mol of ethylene oxide in advance.

The resulting reaction product was dropped into a large quantity of acetone to produce a white powder polymer. The polymer was dissolved in a 2 mol/l KBr aqueous solution at the concentration of 0.5 g/l. Then, the polymer was measured for ultimate viscosity at 25° C. The ultimate viscosity of the polymer was 0.20 dl/g. The polymer had an —$OSO_3K$ group at an end of the molecule, and a sulfonic acid group containing an ethylene oxide moiety and a cationic group having a quaternary nitrogen atom at a side chain of the molecule.

EXAMPLE 12

The flocculant according to the present invention was prepared as follows:

In a closed reaction vessel equipped with a stirrer, a reflux condenser, and a thermometer, 3 mol of methacrylic acid dimethylaminoethylmethyl chloride monomer [$CH_2$=C($CH_3$)$COOC_2H_4N^+$($CH_3$)$_3Cl^-$], 1 mol of acrylic acid methyl monomer, 0.1 mol of styrene sulfonic acid, and 2 mol of ethylene oxide adduct aminoethyl methacrylic acid [$CH_2$=C($CH_3$)$COOC_2H_4N$—(($CH_2H_4O$)$_2$—H)$_2$] obtained by reacting two hydrogen atoms of an amino group of aminoethyl methacrylic acid with ethylene oxide were sequentially added to 5 liters aqueous solution containing 0.02 mol of potassium peroxodisulfate ($K_2S_2O_8$) under nitrogen atmosphere, and reacted at 50° C. for 8 hours.

The resulting reaction product was dropped into a large quantity of acetone to produce a white powder polymer. The polymer was dissolved in a 2 mol/l KBr aqueous solution at the concentration of 0.5 g/l. Then, the polymer was measured for ultimate viscosity at 25° C. The ultimate viscosity of the polymer was 0.30 dl/g.

EXAMPLE 13

The flocculant according to the present invention was prepared as EXAMPLE 1 except that 5 liters aqueous solution containing 0.2 mol of potassium peroxodisulfate ($K_2S_2O_8$) was used. The mixture was reacted at 50° C. for 8 hours. The resulting reaction product was dropped into a large quantity of acetone to produce a white powder polymer. The polymer was dissolved in a 2 mol/l KBr aqueous solution at the concentration of 0.5 g/l. Then, the polymer was measured for ultimate viscosity at 25° C. The ultimate viscosity of the polymer was 0.08 dl/g. The polymer had an —$OSO_3K$ group at an end of the molecule, and an —$SO_3H$ group and a cationic group having a quaternary nitrogen atom at a side chain of the molecule.

EXAMPLE 14

The flocculant according to the present invention was prepared as EXAMPLE 3 except that 5 liters aqueous solution containing 0.2 mol of potassium peroxodisulfate ($K_2S_2O_8$) was used. The mixture was reacted at 50° C. for 8 hours. The resulting reaction product was dropped into a large quantity of acetone to produce a white powder polymer. The polymer was dissolved in a 2 mol/l KBr aqueous solution at the concentration of 0.5 g/l. Then, the polymer was measured for ultimate viscosity at 25° C. The ultimate viscosity of the polymer was 0.12 dl/g. The polymer had an —$OSO_3K$ group at an end of the molecule, and an —$SO_3H$ group and a cationic group having a quaternary nitrogen atom at a side chain of the molecule.

EXAMPLE 15

The flocculant according to the present invention was prepared as follows:

Equal amounts of a surfactant "Plonon 204", which is an oxyethylene-oxypropylene copolymer, available from NOF CORPORATION and "Plonon 208", also available from NOF CORPORATION were mixed. Based on the total solid content, 0.2 wt % of the mixture was added to the flocculant obtained in EXAMPLE 6.

EXAMPLE 16

The waste water containing cutting coolant replenisher (COD 5500 ppm) was treated as EXAMPLE 7 except that the flocculants obtained in EXAMPLES 11 to 15 were respectively used instead of the flocculant obtained in EXAMPLE 1. The normal hexane extract in a water layer was 10 ppm. The COD was 1600 ppm. After the active sludge treatment, all the BOD, the COD, and the SS of the treated waste water were not more than 15 ppm. No normal hexane extract was detected in the water layer.

The waste water containing cutting coolant replenisher was treated under the condition that a calcium chloride aqueous solution coexisted, whereby the normal hexane extract in a water layer was 5 ppm, and the COD was 1550 ppm.

According to the flocculant for separating and flocculating oily components and water components of the present invention, the water content of the oily layer can be decreased. Even if a large amount of oil sludge, in which water, oil and air are mixed, is produced, the flocculant of the present invention can significantly decrease the oil sludge, and separate water and oil easily.

As described above, the flocculant of the present invention comprises a unit (i), and at least one of units (ii) and (iii), wherein X is a group having —$SO_3M$, M is hydrogen or a metal element, Y is a group having a quaternary nitrogen atom, Z is an electrophilic group, each $R_1$ to $R_9$ is hydrogen or an alkyl group, and a ratio per molecule of these units (i):(ii):(iii) is (1 to 100):(1 to 100):(1 to 100). Such flocculant is easily crosslinked with and adsorb microflocs of the colloidal particles. If the emulsion has a high COD value, the oily components and the water components can be effectively separated and flocculated without producing a large amount of sludge. Also, microorganisms in the active sludge are less affected in the secondary treatment.

The flocculant of the present invention comprises the units which are connected and terminated at their ends with —$OSO_3M$ groups, in which M is hydrogen or a metal element, whereby further excellent separation and flocculation are provided, and microorganisms in the active sludge are further less affected in the secondary treatment.

According to other aspect of the present invention, there is provided a flocculant for separating and flocculating oily components and water components comprising a mixture of a compound represented by the general formula $R_0$-Q, and a compound having at least a cationic group, wherein the $R_0$-Q is a hydrocarbon having at least an unsaturated linking in a molecule, and a residue group of the unsaturated linking of a derivative thereof, and Q is either an —$SO_3M$ group or an —$OSO_3M$, in which M is hydrogen or a metal element. Such flocculant is easily crosslinked with and adsorb microflocs of the colloidal particles. The oily components and the water components can be effectively separated and flocculated without producing a large amount of sludge. In the secondary treatment, throughput of the active sludge will not be lowered.

In addition, if the emulsion has a high COD value, the oily components and the water components can be effectively separated and flocculated. Subsequent active sludge treatment can be performed highly smoothly.

FIELD OF INDUSTRIAL APPLICATION

The flocculant of the present invention can effectively separate and flocculate the oily components and the water components contained in the emulsion without producing a large amount of sludge. Also, microorganisms in the active sludge are less affected in the secondary treatment. Accordingly, the flocculant of the present invention can be used for separating and flocculating oil and water in a pretreatment of the waste liquid obtained from general foods, painting, machine oil, machinery, certain food, a coolant, a coloring agent, oil, dyeing, papermaking, latex, and a surfactant.

What is claimed is:

1. A flocculant for use in separating oily components contained in an oil-in-water type or a water-in-oil type emulsion containing suspended matter and dissolved sludge when 0.01 to 10 wt % of said flocculant is added to said emulsion said flocculant is a water soluble polymer having a chemical formula $MO_3$—SO—R—$OSO_3M$, said polymer unit R consisting essentially of:

a unit (i) and a unit (ii) represented by the following formulas:

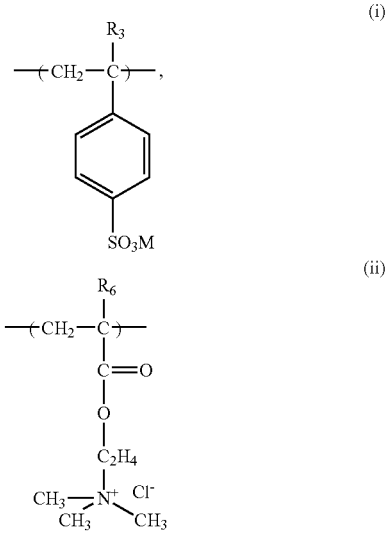

wherein M is hydrogen or a metal element, $R_3$ and $R_6$ are each hydrogen or an alkyl group, and having a ratio per molecule of two units (i):(ii) being (1 to 100):(1 to 100), wherein the —$OSO_3M$ groups, in which M is hydrogen or a metal element, wherein said flocculant is made by polymerizing monomers with a larger amount of peroxodisulfuric acid salt than the amount of an initiator that is used;

wherein an ultimate viscosity of the flocculant is 0.001 to 0.6 dl/g as determined by dissolving a sample in a 2 mol/l KBr solution measured at 25° C.

2. A flocculant as defined in claim 1, wherein at least one of the groups having a sulfonate, or a quaternary nitrogen atom include an alkylene oxide moiety.

3. A flocculant as defined in claim 1, wherein 0.3 to 5 wt %, based on the weight of the monomers, of peroxodisulfuric acid salt is added.

4. A flocculant for use in separating oily components contained in an oil-in-water type or a water-in-oil type emulsion containing suspended matter and dissolved sludge when 0.01 to 10 wt % of said flocculant is added to said emulsion, said flocculant is a water soluble polymer having a chemical formula $MO_3SO$—R—$OSO_3M$, said polymer R consisting essentially of:

a unit (i), a unit (ii) and a unit (iii) represented by the following formulas:

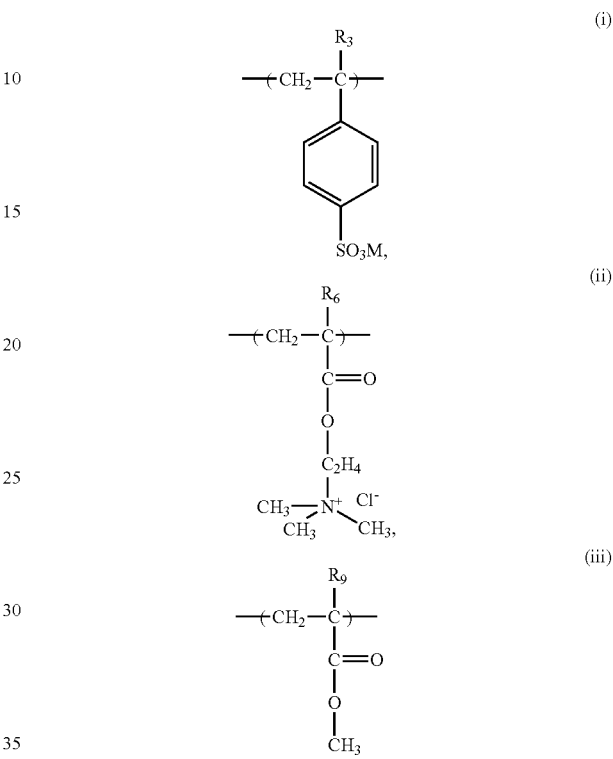

wherein M is hydrogen or a metal element, $R_3$, $R_6$ and $R_9$ are each hydrogen or an alkyl group, and having a ratio per molecule of these units (i):(ii):(iii) being (1 to 100):(1 to 100):(1 to 100), wherein the units are connected and terminated at their ends with —$OSO_3M$ groups, in which M is hydrogen or a metal element, wherein said flocculant is made by polymerizing monomers with a larger amount of peroxodisulfuric acid salt than the amount of an initiator that is used;

wherein an ultimate viscosity of the flocculant is 0.001 to 0.6 dl/g as determined by dissolving a sample in a 2 mol/l KBr solution measured at 25° C.

5. A flocculant as defined in claim 4, wherein at least one of the groups having a sulfonate, a quaternary nitrogen atom and acrylate include an alkylene oxide moiety.

* * * * *